United States Patent
Hoshino (10) Patent No.: US 8,585,128 B2
(45) Date of Patent: Nov. 19, 2013

(54) POWER SUPPLY APPARATUS PROTECTION STRUCTURE

(75) Inventor: Shinichi Hoshino, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 13/637,925

(22) PCT Filed: Apr. 11, 2011

(86) PCT No.: PCT/JP2011/058967
§ 371 (c)(1),
(2), (4) Date: Sep. 27, 2012

(87) PCT Pub. No.: WO2011/145407
PCT Pub. Date: Nov. 24, 2011

(65) Prior Publication Data
US 2013/0015681 A1    Jan. 17, 2013

(30) Foreign Application Priority Data
May 18, 2010   (JP) ................................ 2010-114408

(51) Int. Cl.
*B60K 1/04*   (2006.01)
(52) U.S. Cl.
USPC ............ 296/187.05; 296/187.08; 296/193.02; 296/193.07; 296/203.01; 180/68.5; 429/100
(58) Field of Classification Search
USPC ............ 296/187.03, 187.05, 187.08, 187.11, 296/193.02, 193.07, 193.08, 203.04, 296/203.01, 37.8, 37.16, 37.14; 180/68.5; 429/100
See application file for complete search history.

(56) References Cited

U.S. PATENT DOCUMENTS

| 7,690,686 B2 * | 4/2010 | Hashimura et al. ........... 280/782 |
| 2003/0098191 A1 * | 5/2003 | Takedomi et al. ........... 180/68.5 |

(Continued)

FOREIGN PATENT DOCUMENTS

| JP | 2004/148852 | 5/2004 |
| JP | 2005/112284 | 4/2005 |

(Continued)

OTHER PUBLICATIONS

International Search Report for Application No. PCT/JP2011/058967, dated Jul. 12, 2011.

*Primary Examiner* — Jason S Morrow
(74) *Attorney, Agent, or Firm* — Alston & Bird LLP (57) ABSTRACT

An object of the present invention is to provide a power supply apparatus protection structure which, even in the case in which power supply apparatuses are mounted on a vehicle by being stacked in the height direction of the vehicle, can protect the power supply apparatuses against an external force acting on the vehicle in a predetermined direction and can suppress deformation of an adjoining vehicle body structure component. The present invention provides a power supply apparatus protection structure which includes a power supply apparatus mounted on a vehicle, and a protection frame structure formed by connecting a plurality of frames to each other and adapted to house therein the power supply apparatus, the lower end portion of the protection frame structure being fixed to a floor panel, wherein the protection frame structure includes at least one frame extending along the vehicle width direction, and both of the vehicle-width-direction end portions of the frame are connected to side-surface internal structures of the vehicle, the internal structures having a predetermined stiffness.

2 Claims, 4 Drawing Sheets

(56) References Cited

U.S. PATENT DOCUMENTS

| | | | |
|---|---|---|---|
| 2003/0186115 A1* | 10/2003 | Shibasawa et al. | 429/100 |
| 2004/0079569 A1* | 4/2004 | Awakawa | 180/68.5 |
| 2009/0121510 A1* | 5/2009 | Kim et al. | 296/24.33 |
| 2009/0226806 A1* | 9/2009 | Kiya | 429/186 |
| 2011/0284299 A1* | 11/2011 | Takahashi et al. | 180/65.21 |
| 2011/0297469 A1* | 12/2011 | Usami et al. | 180/68.5 |
| 2012/0021301 A1* | 1/2012 | Ohashi | 429/400 |
| 2012/0097466 A1* | 4/2012 | Usami et al. | 180/68.5 |
| 2012/0125704 A1* | 5/2012 | Kawaguchi et al. | 180/68.5 |
| 2012/0175177 A1* | 7/2012 | Lee et al. | 180/68.5 |
| 2013/0015683 A1* | 1/2013 | Minami | 296/187.08 |

FOREIGN PATENT DOCUMENTS

| | | |
|---|---|---|
| JP | 2005/168158 | 6/2005 |
| JP | 2009/274665 | 11/2009 |
| WO | WO-2009/139229 | 11/2009 |

* cited by examiner

POWER SUPPLY APPARATUS PROTECTION STRUCTURE

TECHNICAL FIELD

The present invention relates to a vehicle power supply apparatus protection structure, and more particularly relates to a power supply apparatus protection structure in which a power supply apparatus housed in a protection frame structure formed by a plurality of frames is protected by releasing an external force to a vehicle body through the protection frame structure.

BACKGROUND ART

In a vehicle, such as an electric vehicle and a hybrid vehicle, which is a type that travels using a motor, a structure is adopted in which a power supply apparatus serving as a drive source of the motor is mounted in a luggage compartment having a sufficient crushable zone secured against an external force acting from the rear side (a rear-end collision). With such a protection structure, the impact is absorbed by the crushable zone so that the load applied to the power supply apparatus is reduced. Also, a vehicle component is prevented from directly entering the power supply apparatus and damaging the power supply apparatus.

However, in such a protection structure, in the case in which a power supply apparatus is mounted in a narrow luggage compartment space of a smaller hatchback type vehicle and the like, there is a case in which a sufficient crushable zone cannot be secured against an external force due to a rear-end collision.

As a conventional technique of the power supply apparatus protection structure, there has been proposed a technique in which a power supply apparatus (secondary battery) is housed in a protection frame structure (frame unit) formed by a plurality of frames so as to enable an external force acting on the power supply apparatus to be suppressed (Patent Literature 1).

CITATION LIST

Patent Document

Patent Document 1: Japanese Patent Laid-Open No. 2009-274665

SUMMARY OF INVENTION

Technical Problem

However, the technique proposed in Patent Document 1 has the following problems, for example, in such a case of mounting a power supply apparatus which is extended in the height direction of the vehicle due to an increase in the capacity of the secondary battery of the power supply apparatus.

(1) The protection frame structure is fixed only at the lower end portion thereof, and hence, the position of the center of gravity of the protection frame structure becomes high. Therefore, in the case in which only the lower end portion of the protection frame structure is fixed to the floor panel by using a fixing member, it is not possible to obtain sufficient stability in the vehicle height direction of the protection frame structure. Further, in the case in which the position of the center of gravity of the protection frame structure becomes high, the upper side of the protection frame structure tends to be easily distorted due to the running of the vehicle.

The insufficient stability in the vehicle height direction and the occurrence of distortion on the upper side of the protection frame structure can be avoided by increasing the stiffness of the protection frame structure itself and by firmly fixing the lower end portion of the protection frame structure. However, these measures result in an increase in the weight of the protection frame structure and the vehicle.

(2) The protection frame structure is allowed to be moved by an external force acting on an outer peripheral portion of the vehicle from the rear side of the vehicle (for example, a collision (rear-end collision) with the other vehicle). Therefore, when the protection frame structure is pushed by an adjoining vehicle body structure component (for example, a back door) which is deformed simultaneously with the action of the external force, the protection frame structure may be overturned toward the front side of the vehicle.

An object of the present invention is to provide a power supply apparatus protection structure which, even in the case of power supply apparatuses that are stacked in the height direction of a vehicle and are mounted on the vehicle, can protect the power supply apparatuses against an external force acting on the vehicle in a predetermined direction, and can suppress deformation of an adjoining vehicle body structure component.

Solution to Problem

The present invention is to provide a power supply apparatus protection structure which includes a power supply apparatus mounted on a vehicle, and a protection frame structure formed by connecting a plurality of frames to each other and adapted to house therein the power supply apparatus, the lower end portion of the protection frame structure being fixed to a floor panel, wherein the protection frame structure includes at least one frame extending along the vehicle width direction, and both of the vehicle-width-direction end portions of the frame are connected to side-surface internal structures of the vehicle, the internal structures having a predetermined stiffness.

Advantageous Effects of Invention

The power supply apparatus protection structure according to the present invention can, when a vehicle and a protection frame structure receive an external force, release the received external force to the vehicle body via a frame extending along the vehicle width direction and connected to internal structures of the vehicle.

Thereby, even in the case in which power supply apparatuses are mounted on the vehicle by being stacked in the height direction of the vehicle, the power supply apparatus protection structure according to the present invention can protect the power supply apparatuses against an external force applied to the vehicle in a predetermined direction.

DESCRIPTION OF EMBODIMENTS

A power supply apparatus protection structure according to the present invention is configured to protect a power supply apparatus in such a manner that, when a vehicle and a protection frame structure receive an external force, the received external force is released to a vehicle body via a frame which is extended along the vehicle width direction and connected to internal structures of the vehicle.

In the following, an embodiment according to the present invention will be described with reference to the accompanying drawings.

[Embodiment]

Figure 6:
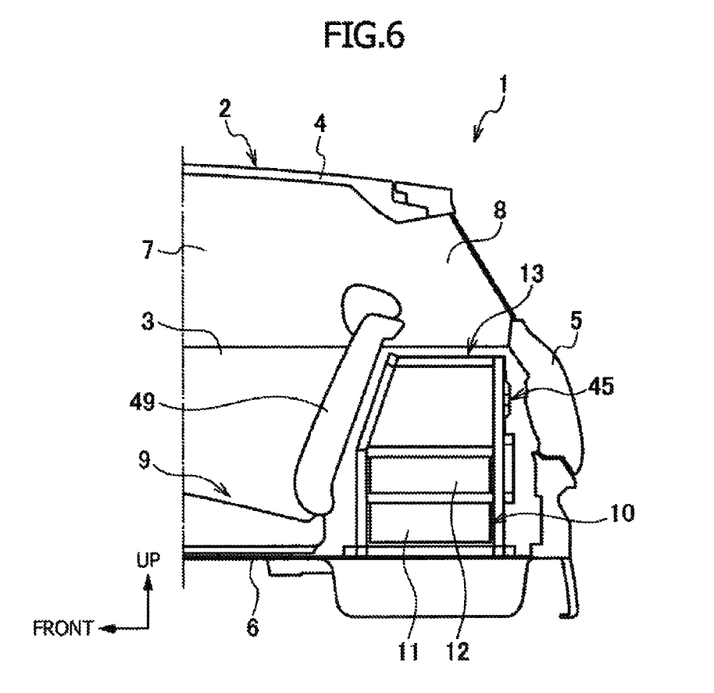
FIG. 6 is a side view of a vehicle rear portion in which the power supply apparatus protection structure is mounted. (Embodiment)

In FIG. 6, reference numeral 1 denotes a vehicle, reference numeral 2 denotes a vehicle body, reference numeral 3 denotes a side body, reference numeral 4 denotes a roof, reference numeral 5 denotes a back door, reference numeral 6 denotes a floor panel, reference numeral 7 denotes a vehicle compartment, and reference numeral 8 denotes a luggage compartment. In the vehicle 1, a rear seat 9 is arranged on the floor panel 6 of the vehicle compartment 7, and a power supply apparatus 10 is mounted on the floor panel 6 of the luggage compartment 8 between the rear seat 9 and the back door 5. The power supply apparatus 10 consists of two secondary batteries 11 and 12 which generate a high voltage, and is stored in a protection frame structure 13. The lower end portion of the protection frame structure 13 is fixed on the floor panel 6. Note that, in the protection frame structure 13, not only the secondary batteries 11 and 12, but also auxiliary devices (not shown) are stacked and held in the vehicle height direction so as to be mounted in the luggage compartment 8 of the vehicle 1.

Figure 1:
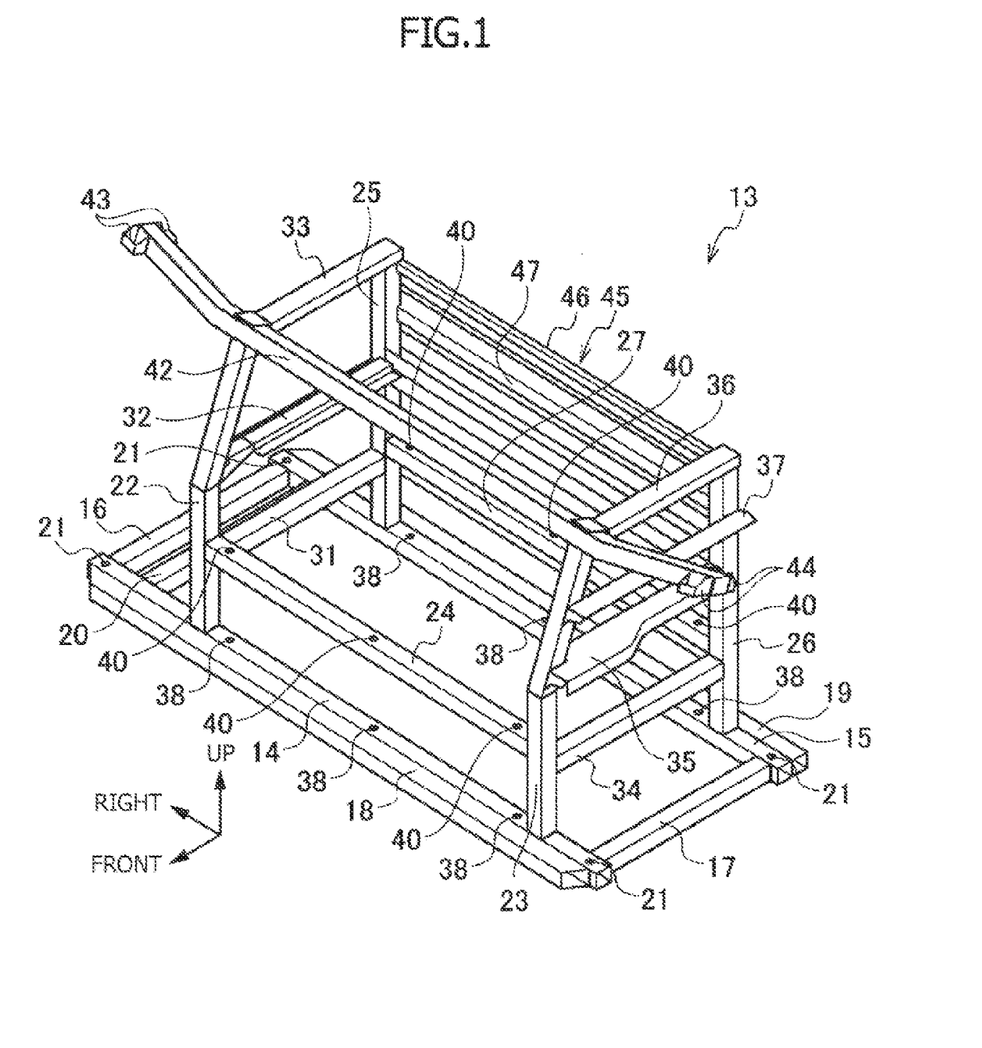
FIG. 1 is a perspective view of a protection frame structure. (Embodiment)
Figure 2:
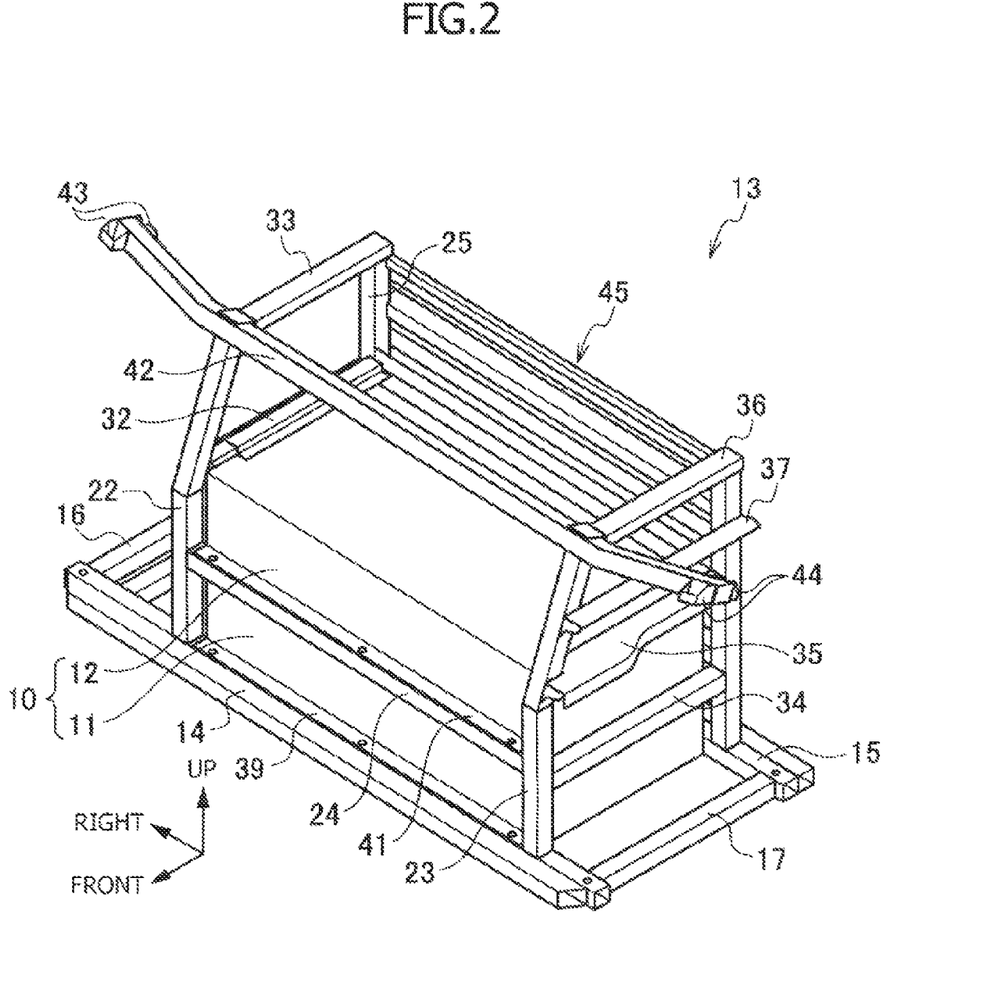
FIG. 2 is a perspective view of the protection frame structure in which a power supply apparatus is housed. (Embodiment)

As shown in FIG. 1 and FIG. 2, the protection frame structure 13 includes a first frame 14 and a second frame 15 arranged on the floor panel 6 of the luggage compartment 8 so as to be separated from each other in the vehicle longitudinal direction (vehicle front-rear direction) and so as to extend in parallel with the vehicle width direction. Both ends of a third frame 16 extending in the vehicle longitudinal direction are respectively connected to one vehicle-width-direction end of the first frame 14 and one vehicle-width-direction end of the second frame 15. Both ends of a fourth frame 17 extending in the vehicle longitudinal direction are respectively connected to the other vehicle-width-direction end of the first frame 14 and the other vehicle-width-direction end of the second frame 15. The vehicle-longitudinal-direction length of the third frame 16 and the fourth frame 17 is made equal to the vehicle-longitudinal-direction length of the secondary batteries 11 and 12. A reinforcing frame 18 is attached to the front side of the first frame 14. A reinforcing frame 19 is attached to the rear side of the second frame 15. On the inner side of the third frame 16, both ends of a reinforcing frame 20 arranged in parallel with the third frame 16 are connected to the first frame 14 and the second frame 15, respectively.

A rectangular shaped base frame of the protection frame structure 13 is formed by the first frame 14, the second frame 15, the third frame 16, and the fourth frame 17. A fixing hole 21 is provided at each end of each of the first frame 14 and the second frame 15 which form the base. The protection frame structure 13 is fixed to the floor panel 6 by using fixtures, such as bolts, inserted into the fixing holes 21.

Lower ends of a fifth frame 22 and a sixth frame 23, which extend upward, are respectively connected to the portions of the first frame 14, which are located in the vicinity of both vehicle-width-direction ends of the first frame 14. The separation distance between the fifth frame 22 and the sixth frame 23 is made equal to the vehicle-width-direction length of the secondary batteries 11 and 12. At an intermediate position which is as high as the upper surface of the two stacked secondary batteries 11 and 12, each of the fifth frame 22 and the sixth frame 23 is bent so as to be inclined toward the rear side. At a height position which is lower than the intermediate position and which corresponds to the height of the upper surface of the one secondary battery 11, the fifth frame 22 and the sixth frame 23 are connected to each other by a seventh frame 24 extending in the vehicle width direction.

Lower ends of an eighth frame 25 and a ninth frame 26, which extend upward, are respectively connected to the portions of the second frame 15, which are located in the vicinity of both vehicle-width-direction ends of the second frame 15 so that the eighth frame 25 and the ninth frame 26 are respectively paired with the fifth frame 22 and the sixth frame 23. The separation distance between the eighth frame 25 and the ninth frame 26 is made equal to the vehicle-width-direction length of the secondary batteries 11 and 12. A tenth frame 27 extending in the vehicle width direction is connected to the eighth frame 25 and the ninth frame 26 at a height position which is lower than the intermediate position and which corresponds to the height of the upper surface of the one secondary battery 11.

Figure 3:
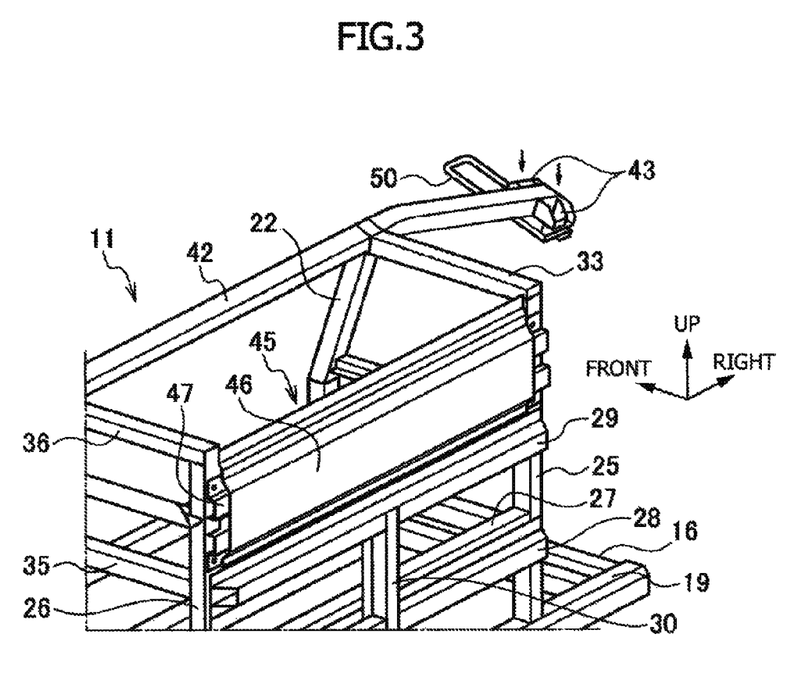
FIG. 3 is a perspective view of a partition wall connected to the rear end surface of the frames. (Embodiment)

Note that, as shown in FIG. 3, a reinforcing frame 28 extending in the vehicle width direction is attached to the eighth frame 25 and the ninth frame 26 at the rear side position thereof which is as high as the upper surface of the one secondary battery 11, and a reinforcing frame 29 extending in the vehicle width direction is attached to the eighth frame 25 and the ninth frame 26 at the rear side intermediate position thereof which is as high as the upper surface of the two stacked secondary batteries 11 and 12. The two reinforcing frames 28 and 29 are connected to each other by an auxiliary frame 30 extending in the vehicle vertical direction.

The fifth frame 22 and the eighth frame 25 arranged side by side in the vehicle longitudinal direction are connected to each other by an eleventh frame 31 extending in the vehicle longitudinal direction at a position as high as the upper surface of the one secondary battery 11, and are connected to each other by a twelfth frame 32 extending in the vehicle longitudinal direction at the intermediate position as high as the upper surface of the two stacked secondary batteries 11 and 12. The uppermost ends of the fifth frame 22 and the eighth frame 25 are connected to each other by a thirteenth frame 33 extending in the vehicle longitudinal direction. The length of the thirteenth frame 33 is shorter than the length of the eleventh and twelfth frames 31 and 32.

The sixth frame 23 and the ninth frame 26 arranged side by side in the vehicle longitudinal direction are connected to each other by an fourteenth frame 34 extending in the vehicle longitudinal direction at positions as high as the upper surface of the one secondary battery 11, and are connected to each other by a fifteenth frame 35 extending in the vehicle longitudinal direction at the intermediate position as high as the upper surface of the two stacked secondary batteries 11 and 12. The uppermost ends of the sixth frame 23 and the ninth frame 26 are connected to each other by a sixteenth frame 36 extending in the vehicle longitudinal direction. The length of the sixteenth frame 36 is shorter than the length of the fourteenth and fifteenth frames 34 and 35. Note that an auxiliary frame 37 extending in the vehicle longitudinal direction is attached to the sixth frame 23 and the ninth frame 26 at a position between the fifteenth frame 35 and the sixteenth frames 36.

As shown in FIG. 1, in the protection frame structure 13, mounting holes 38 are provided in the first frame 14 at positions between the fifth frame 22 and the sixth frames 23, and are also provided in the second frame 15 at positions between the eighth frame 25 and the ninth frame 26. As shown in FIG. 2, the lower stage secondary battery 11 is housed in the protection frame structure 13 by attaching mounting portions 39 of the secondary battery 11 to the respective mounting holes 38 of the first frame 14 and the second frame 15 by fittings, such as bolts.

Further, in the protection frame structure 13, mounting holes 40 are provided in the seventh frame 24 at positions between the fifth frame 22 and the sixth frames 23, and are also provided in the tenth frame 27 at positions between the eighth frame 25 and the ninth frame 26. As shown in FIG. 2, the upper stage secondary battery 12 is housed on an upper portion of the lower stage secondary battery 11 in the protection frame structure 13 by attaching mounting portions 41 of the secondary battery 12 to the respective mounting holes 40 of the seventh frame 24 and the tenth frame 27 by fittings, such as bolts.

The protection frame structure 13 includes a seventeenth frame 42 as a frame extending along the vehicle width direction. The seventeenth frame 42 is connected to the upper end of the rearward-inclined portion of each of the fifth frame 22 and the sixth frame 23 so that both of the vehicle-width-direction end portions of the seventeenth frame 42 respectively reach the right side body 3 and the left side body (not shown). The seventeenth frame 42 arranged at the front-side upper end portions of the fifth frame 22 and the sixth frame 23 is bent at the connecting portions with the fifth frame 22 and the sixth frame 23 so that both of the vehicle-width-direction side portions of the seventeenth frame 42 extend to be directed toward the rear side of the vehicle 1.

Connecting portions 43 and 44 are provided at both of the vehicle-width-direction end portions of the seventeenth frame 42, respectively. The connecting portions 43 and 44 respectively provided at the both end portions of the seventeenth frame 42 are respectively connected, by connecting members, such as bolts, to the right side body 3 and the left side body (not shown) which are side-surface internal structures of the vehicle 1 and which have a predetermined stiffness.

Thereby, in the protection frame structure 13, both of the vehicle-width-direction end portions of the seventeenth frame 42 are respectively connected to the side body 3, as vehicle body structure components, which has the predetermined stiffness. Therefore, when the vehicle 1 and the protection frame structure 13 receive an external force from the rear side, the external force can be released from the side body 3 to the vehicle body 2 via the seventeenth frame 42 which is connected to the vehicle 1 and which extends along the vehicle width direction.

Further, in the protection frame structure 13, both of the vehicle-width-direction side portions of the seventeenth frame 42 has a structure in which the both side portions extend so as to be directed toward the predetermined direction of the external force acting on the vehicle 1. Thereby, the external force can be effectively transmitted to the vehicle body 2, so that local destruction of the protection frame structure 13 and the vehicle body 2 can be suppressed.

Figure 4:
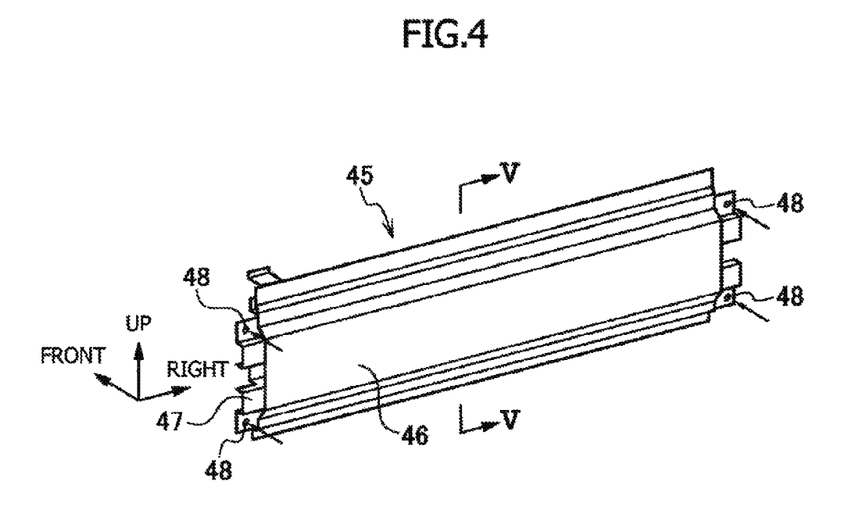
FIG. 4 is a perspective view of the partition wall. (Embodiment)
Figure 5:
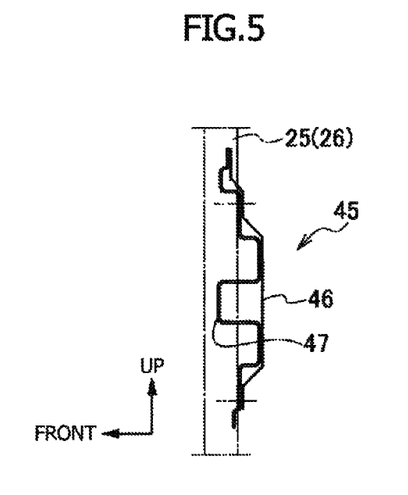
FIG. 5 is a cross-sectional view taken along the line V-V of FIG. 4. (Embodiment)

As shown in FIG. 3, the protection frame structure 13 is provided with a partition wall 45 which mutually connects the rear end surfaces of the upper portions of the eighth frame 25 and the ninth frame 26 which are located on the rear end and both of the vehicle-width-direction sides of the protection frame structure 13. As shown in FIG. 4 and FIG. 5, the partition wall 45 is configured by a first member 46 elongated in the vehicle width direction and facing the rear side back door 5, and a second member 47 elongated in the vehicle width direction and connected to the front side of the first member 46 by welding, or the like. The first member 46 and the second member 47 are provided with a size that can cope with deformation of the back door 5, and are bent in the width direction (vertical direction) with respect to the lengthwise direction thereof, so as to thereby improve the stiffness.

Two mounting holes 48 are provided at each lengthwise-direction end of the second member 47, in the partition wall 45. In the state in which the first member 46 is made to face the back door 5, the partition wall 45 is fixed to the rear end surfaces of the eighth frame 25 and the ninth frame 26 by inserting fixtures, such as bolts, into the four mounting holes 48 of the second member 47.

Thereby, in the protection frame structure 13, the eighth frame 25 and the ninth frame 26, which are located on both of the vehicle-width-direction sides, are fixed to the partition wall 45 at three or more attachment points which do not exist on one straight line. The rear end surface of the partition wall 45 is provided with a size that can cope with deformation of the back door 5, as a vehicle body structure component, which is located on the rear side of and adjacent to the protection frame structure 13. Therefore, when the back door 5 is deformed by an external force applied from the rear side of the vehicle, the back door 5 is received by the rear end surface of the partition wall 45. Thereby, the deformation of the back door 5 can be suppressed, and the local action of the external force on the protection frame structure 13 is prevented more than in the case in which the external force is merely received by a frame. As a result, local deformation and destruction of the protection frame structure 13 can be suppressed.

The partition wall 45 is attached to the protection frame structure 13 at three or more attachment points which do not exist on one straight line, and thereby it is possible to provide the protection frame structure 13 which suppresses the generation of distortion and which has an improved stiffness. Further, the partition wall 45 is attached from the external force acting direction (the rear side), and hence the external force received by the partition wall 45 can be transmitted to the eighth frame 25 and the ninth frame 26 to which the partition wall 45 is attached. As a result, the external force can be received by the protection frame structure 13 as a whole.

As described above, among the frames of the protection frame structure 13, the seventeenth frame 42, provided on the front upper end portion of the protection frame structure 13 so as to extend in the vehicle width direction, has a structure in which the both side portions thereof extend toward the vehicle rear side so as to be directed toward the direction of the external force (the rear side), and in which the both ends thereof are provided with the connecting portions 43 and 44 for connection with the vehicle body 2. On the other hand, the vehicle 1 is provided with the right side body 3 and the left side body (not shown), as internal structures, to which the connecting portions 43 and 44 are attached, and the connecting portions 43 and 44 are respectively connected to the right and left side bodies by connecting members, such as bolts. Further, among the frames which form the protection frame structure 13 and which extend along the height direction, the eighth frame 25 and the ninth frame 26 that are located on the rear side of the protection frame structure 13 are provided, at the rear end thereof, with the partition wall 45 which is attached from the rear side of the protection frame structure 13. Note that the plurality of frames, which form the protection frame structure 13, are connected to each other by fastening members, such as bolts, or by welding, and the inside of the protection frame structure 13 is hollow.

The longitudinal-direction length of the upper end of the protection frame structure 13 is shorter than the longitudinal-direction length of the base portion on the lower side of the protection frame structure 13. This is because, as shown in FIG. 6, the protection frame structure 13 is installed close to the rear side of the rear seat 9, and because a seat back 49 of the rear seat 9 is configured to be inclined toward the rear and upper side of the vehicle. Further, the vehicle-longitudinal-direction length of the upper end of the protection frame structure 13 is set shorter than the vehicle-longitudinal-direction length of the secondary batteries 11 and 12 of the power supply apparatus 10 housed in the protection frame structure 13. For this reason, the present embodiment is configured such that, after the secondary batteries 11 and 12 are housed and attached in the protection frame structure 13, the partition wall 45 is attached to the protection frame structure 13. Thereby, the protection frame structure 13 can be installed on the vehicle front side as much as possible.

More specifically, as shown in FIG. 1 and FIG. 2, each of the fifth frame 22 and the sixth frame 23, which form the protection frame structure 13 and which extend in the vertical direction on the front side, has a structure in which the portion ranging from the lower end to the intermediate position is extended in the vertical direction, and in which the portion ranging from the intermediate position to the upper end is inclined toward the rear side. The intermediate position is set to a position as high as the upper surface of the upper stage secondary battery 12 of the two vertically stacked secondary batteries 11 and 12.

The partition wall 45 is attached to the rear side upper portion of the protection frame structure 13. The partition wall 45 is attached to the protection frame structure 13 after the secondary batteries 11 and 12 are housed in the protection frame structure 13. Note that the eighth frame 25 and the ninth frame 26, to which the partition wall 45 of the present embodiment is attached, is configured to linearly extend in the vertical direction. However, the eighth frame 25 and the ninth frame 26 may also be configured to have bent portions which allow the partition wall 45 to be placed in parallel with the components adjacent to the partition wall 45 in the state in which the protection frame structure 13 is mounted on the vehicle 1.

The mounting holes 21 for fixing the protection frame structure 13 to the floor panel 6 of the vehicle body 2 are provided in the first frame 14 to the fourth frame 17 which form the lower end base of the protection frame structure 13. On the other hand, a plurality of structural members are attached to the floor panel 6 for obtaining the stiffness of the vehicle body 2 itself, and hence the floor panel 6 has a certain amount of stiffness. The mounting holes 21 are provided at the four corners of the base formed by the first frame 14 to the fourth frame 17, and the base is fixed to the floor panel 6 by inserting fixtures, such as bolts, into the mounting holes 21.

As shown in FIG. 3 to FIG. 5, the seventeenth frame 42 extending in the width direction of the protection frame structure 13 is provided at the upper end portions of the fifth frame 22 and the sixth frame 23 provided on the front side of the protection frame structure 13. The connecting portions 43 and 44 for fixing the seventeenth frame 42 to the vehicle body 2 are provided at the both end portions of the seventeenth frame 42. In the protection frame structure 13 mounted on the vehicle 1, the distortion on the upper side of the protection frame structure 13 can be suppressed by respectively connecting the connecting portions 43 and 44 to the right side body 6 and the left side body. Further, in the protection frame structure 13, the external force received by the protection frame structure 13 can be transmitted to the vehicle body 2 through the connection structure of the seventeenth frame 42. Thereby, local deformation and destruction of the vehicle body 2 can be prevented more than in the structure in which only the lower end of the protection frame structure 13 is fixed to the floor panel 6.

It is preferred that, as in the present embodiment, the seventeenth frame 42 connected to the side body 3 is attached to the front upper end portion of the protection frame structure 13. The reason why the front end portion of the protection frame structure 13 is preferred is that it is preferred to secure as long a distance as possible between the seventeenth frame 42 and the vehicle rear end at which the vehicle body 2 is highly possibly deformed by an external force due to a collision, or the like, with the other vehicle. The reason why the upper end portion of the protection frame structure 13 is preferred is that the effect of preventing distortion of the upper side of the protection frame structure 13, and the effect of preventing the overturning of the protection frame structure 13 due to an adjoining vehicle body structure component deformed by the external force are high.

Further, both of the width-direction sides of the seventeenth frame 42 are configured to extend so as to be directed toward the direction opposite to the predetermined direction of the external force which may act on the vehicle 1, specifically, opposite to the direction of the external force which acts on the vehicle 1 by a vehicle rear-end collision, or the like, with the other vehicle. When the vehicle 1 receives the external force, the seventeenth frame 42 acts to pull, in the same direction as the direction of the external force, the right side body 3 and the left side body which are respectively connected to the both sides of the seventeenth frame 42, and thereby can effectively suppress the movement of the protection frame structure 13 due to the external force. If the seventeenth frame 42 is connected to the vehicle body 1 so as to extend simply in the width direction in a horizontal line shape, the possibility that the seventeenth frame 42 and the side body 3 are locally deformed and destructed is higher than in the above-described structure (structure in which both of the width-direction sides of the seventeenth frame 42 extend toward the direction opposite to the direction of the external force acting on the vehicle 1), and hence the structure of the present embodiment described above is excellent in this point.

By using a right striker 50 (see FIG. 3) and a left striker (not shown), which are attached to the side of the vehicle body 2 of the vehicle 1 to fix the seat back 49 of the rear seat 9, the connecting portions 43 and 44 of the seventeenth frame 42 can be respectively connected to the right striker 50 and the left striker with connectors, such as bolts. The right striker 50 and the left striker are respectively attached to internal structures provided on the side surfaces of the vehicle body 2 and extending in the longitudinal and vertical directions of the vehicle 1, that is, are respectively attached to so-called the right side body 3 and the left side body. The mounting positions of the right striker 50 and the left striker, and the portions around the mounting positions have a certain amount of stiffness by means of the other vehicle body structure components (not shown). Note that the portions, to which the connecting portions 43 and 44 of the seventeenth frame 42 are attached, are not limited to the strikers as shown in the present embodiment, and may be the other structure components of the side body 3, which also have a sufficient stiffness.

The partition wall 45 extending in the extending direction of the vehicle-width-direction central portion of the seventeenth frame 42, that is, extending along the vehicle width direction is attached on the upper end rear side of the protection frame structure 13. The partition wall 45 can provide the following effects.

A measure against the distortion of the protection frame structure 13 can be provided, and the stiffness of the protection frame structure 13 can be improved.

The deformation of an adjoining vehicle body structure component (back door 5) due to an external force can be suppressed.

The local deformation and destruction of the protection frame structure 13 can be suppressed by receiving, by the wide surface of the partition wall 45, an adjoining vehicle body structure component deformed by the external force.

An adjoining vehicle body structure component can be received by the partition wall 45 and by the protection frame structure 13 irrespective of the direction of the external force received by the vehicle 1 from the rear side.

The partition wall 45 is attached from the rear side of the eighth frame 25 and the ninth frame 26 to which the partition wall 45 is attached (the predetermined direction of external force which may be applied to the vehicle 1). The direction is the same as the direction of the external force which is received by the protection frame structure 13. The partition wall 45 is attached to the protection frame structure 13 by fixing the four corners of the partition wall 45 by using fixtures, such as bolts. The partition wall 45 is formed by two members of the first member 46 and the second member 47, and the stiffness of the partition wall 45 is improved by joining the two members together by welding, or the like. A part of the second member 47, which is a component of the partition wall 45, is formed to project beyond the rear surface of each of the eighth frame 25 and the ninth frame 26 to which the partition wall 45 is attached, toward the inside of the protection frame structure 13 to such an extent that the projecting portion of the second member 47 is not brought into contact with the secondary batteries 11 and 12, and auxiliary devices which are installed in the protection frame structure 13. This provides the partition wall 45 with a shape which can improve the stiffness of the partition wall 45 while preventing the protection frame structure 13 from projecting to the side of the vehicle body structure component (back door 5) located on the rear side of and adjacent to the protection frame structure 13.

As shown in FIG. 6, the protection frame structure 13 is installed in the luggage compartment 8 so as to be sandwiched between the rear seat 9 and the back door 5. The lower end of the partition wall 45 is located at the same level as the lower end of the back door 5. Therefore, when the external force is applied to the back door 5, the entering of the back door 5 into the protection frame structure 13 is prevented by the partition wall 45, and by the eighth frame 25 and the ninth frame 26 to which the partition wall 45 is attached.

Industrial Applicability

The present invention is to provide a structure in which, when a vehicle and a protection frame structure receive an external force, the received external force can be released to the vehicle body via a frame extending along the vehicle width direction and connected to an internal structure of the vehicle. Therefore, the present invention can be applied not only to the protection of a power supply apparatus, but also to the protection of a vehicle component mounted in the luggage compartment.

The invention claimed is:

1. A power supply apparatus protection structure comprising:
   a power supply apparatus mounted in a vehicle; and
   a protection frame structure formed by connecting a plurality of frames to each other and adapted to house therein the power supply apparatus, the lower end portion of the protection frame structure being fixed to a floor panel, wherein
   the protection frame structure includes at least one frame extending along a vehicle width direction, and both of vehicle-width-direction end portions of the frame are connected to side-surface internal structures of the vehicle, the internal structures having a predetermined stiffness,
   wherein a front upper end portion of the protection frame structure is inclined toward the vehicle rear side so as to be located on the rear side of the vehicle with respect to a front lower end portion; and
   among the frames extending along the vehicle width direction, the frame arranged at and connected to the front upper end portion of the protection frame structure has a structure in which both of the vehicle-width-direction sides of the frame are bent at the connecting portions with the front upper end portions and extend so as to be directed toward the rear side of the vehicle, and in which the rear end portions of the frame are connected to side-surface internal structures of the vehicle.

2. The power supply apparatus protection structure according to claim 1, wherein:
   a partition wall which mutually connects the rear end surfaces of the frames located on the rear end and both of the vehicle-width-direction sides of the protection frame structure is provided;
   the partition wall is fixed to the frames located on both of the vehicle-width-direction sides, at three or more attachment points which do not exist on a straight line; and
   the rear end surface of the partition wall is provided with a surface that is disposed along the vehicle vertical direction so as to face a back door of a vehicle body structure component located on the rear side of and adjacent to the protection frame structure.

* * * * *